United States Patent [19]
Bertalot

[11] 3,887,155
[45] June 3, 1975

[54] TELESCOPING SUPPORT MECHANISM

[75] Inventor: Silvio Bertalot, Malnata, Varese, Italy

[73] Assignee: U.S. Philips Corporation, New York, N.Y.

[22] Filed: Dec. 7, 1973

[21] Appl. No.: 422,912

[30] Foreign Application Priority Data
Dec. 7, 1972  Italy .................................. 23966/72

[52] U.S. Cl. ............. 248/333; 108/144; 248/188.5; 308/6 R
[51] Int. Cl. ........................................... F16c 19/00
[58] Field of Search ................ 248/333, 188.5, 157; 108/144; 403/109, 104; 308/6 R, 3.8, 25, 15, 33; 312/332; 182/38, 142, 62.5, 147

[56] References Cited
UNITED STATES PATENTS
354,744   12/1886   Sabot .................................. 312/332
989,069   4/1911   Siewart .............................. 403/169
2,835,520   5/1958   Shiring ......................... 248/333 UX
2,854,078   9/1958   Conner ............................ 108/144 X
3,285,207   11/1966   Vom Hagen ....................... 108/144
3,776,500   12/1973   Foderaro ............................ 248/333

Primary Examiner—James T. McCall
Attorney, Agent, or Firm—Frank R. Trifari

[57] ABSTRACT

A telescoping support arm of quadrangular cross-section has roller bearings in diametral corner spaces between each two tubes surrounding each other, the rollers in one corner rolling over separate races supported on resilient means urging the rollers and the inner tube toward the other corner so as to exclude backlash.

7 Claims, 5 Drawing Figures

TELESCOPING SUPPORT MECHANISM

BACKGROUND OF THE INVENTION

The present invention relates to a telescoping support mechanism comprising a plurality of coaxial tubular sections of substantially square cross-section which are adapted to slide in one another with the interposition of rollers. Such a mechanism is suitable for supporting operating-room lamps, radiation sources and other instruments which require accurate non-changing displaceability without backlash.

Known mechanisms of this type, see for example U.S. Pat. No. 3,244,883, require accurate and hence expensive manufacture of the telescoping sections, and it is an object of the present invention to provide a construction which does not suffer from this drawback.

SUMMARY OF THE INVENTION

According to this invention, there is at least one cage of L-shaped cross-sections accommodated in the space of L-shaped cross-section between the outer surfaces of two adjoining walls of each inner tubular section and the directly opposite facing inner surfaces of the outer tubular section embracing said inner section. This cage contains rollers capable of rolling on the surfaces, while in the similar L-shaped space situated diametrically opposite the first mentioned space, at least one second cage of L-shaped cross-section is accommodated. The rollers at one side of this second cage roll on two adjoining surfaces of one of the two embracing sections, and at the other side on two separate races which via resilient means are joined to the other of the said two embracing sections. These resilient means exert on the inner section a resultant force directed diametrically towards the first cage so as to enclose the rollers of the first cage between the two sections without any backlash.

It will be clear that in this construction, owing to the use of the said resilient means, the desired freedom from backlash is satisfactorily obtained with the use of tubular sections finished with only a limited degree of accuracy, so that the cost may be kept within acceptable limits.

The features and advantages of the invention will be better understood with reference to the accompanying diagrammatic drawings.

DETAILED DESCRIPTION OF THE PREFERRED EMBODIMENT

Figure 1:
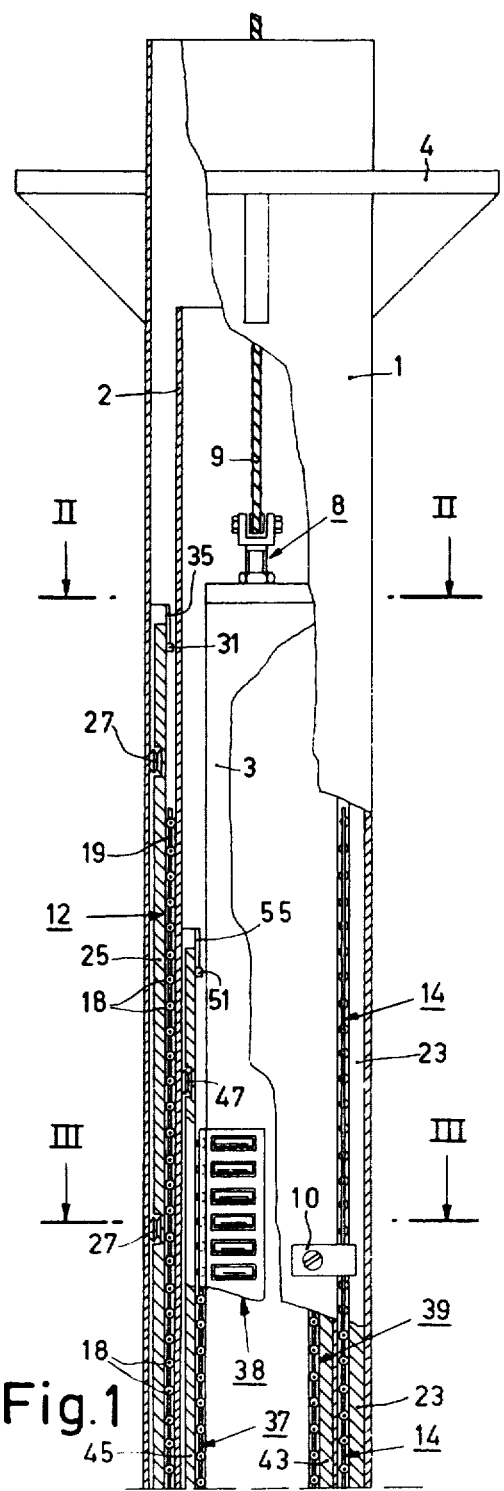
FIGS. 1 and 1a together are an axial sectional view of an exemplary embodiment of the mechanism according to the invention.
Figure 1A:
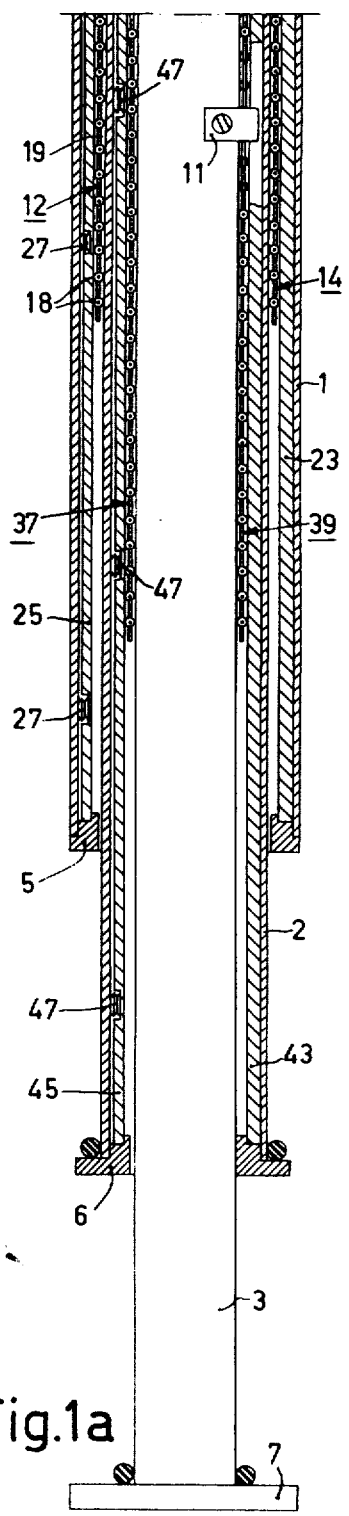

Referring now to the Figures a telescoping mechanism comprises three tubular sections 1, 2 and 3 of square cross-section inserted one into the other so as to be axially displaceable. The outer section 1 near its upper end has a flange 4 adapted to be secured to an upper cover, and at its lower end is partly closed by a stopper or abutment 5. The intermediate section 2 has a lower flanged stopper 6, and the inner section 3 is provided with a flanged stopper 7 at the lower end and with means 8 for securing a suspension cable 9.

The outer surfaces of the sections 2 and 3 have brackets 10 and 11 respectively secured to them which when they engage the stopper 5 and the flanged stopper 6 respectively determine the maximum length of travel of the said sections and hence the extensibility of the telescoping mechanism.

Figure 2:
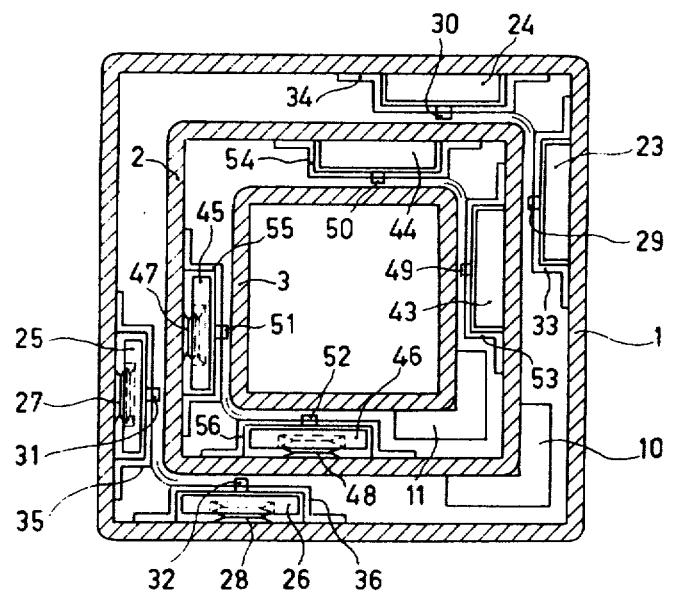
FIG. 2 is a cross-sectional view of this mechanism taken on the line II—II in FIG. 1.
Figure 3:
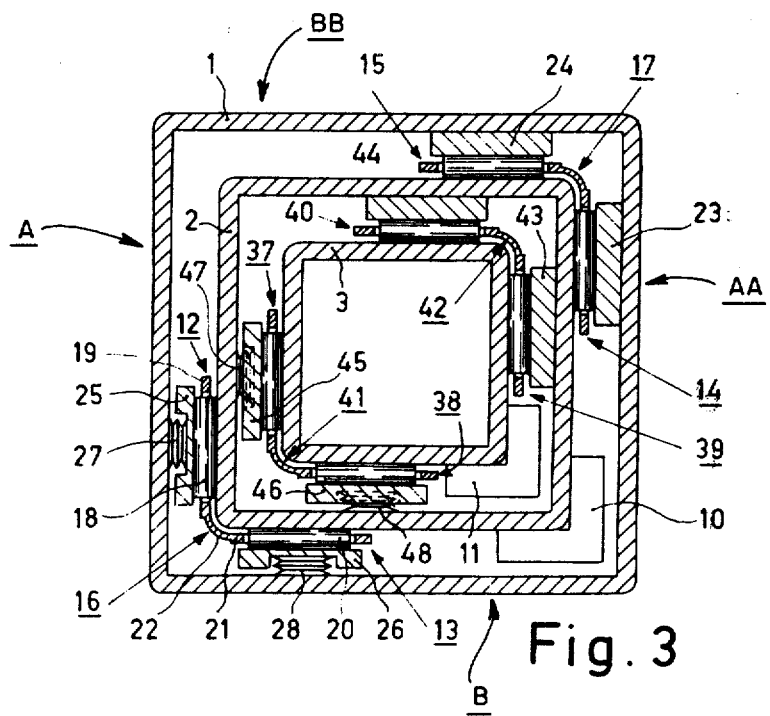
FIG. 3 is a cross-sectional view of the said mechanism taken on the line III—III in FIG. 1.

In two diagonally situated spaces of L-shaped section between the four inner surfaces of the outer section 1 and the outer surfaces of the intermediate section 2 (which is the inner section with respect to the section 1) four cage parts or bearing means 12, 13, 14 and 15 accommodating rollers are axially and displaceably mounted and rigidly secured to one another in pairs so as to form units of L-shaped section or cages 16 and 17, which are arranged symmetrically with respect to a diagonal of the section 1 (FIGS. 2 and 3). For convenience the four sides are designated A, AA opposite A, B between A and AA, and BB opposite B.

Figure 4:
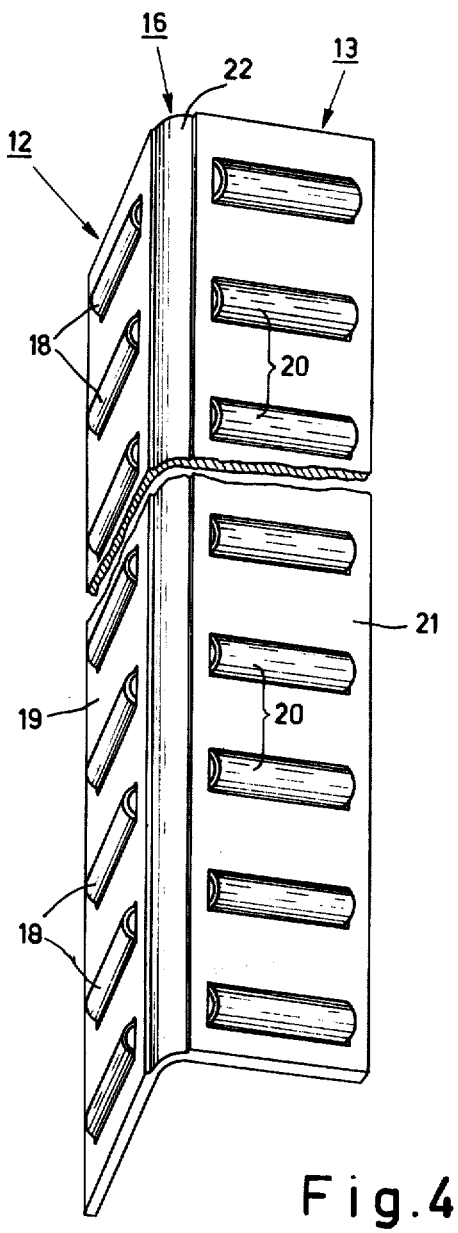
FIG. 4 is a perspective view of a two-part cage which accommodates rollers; these parts are rigidly joined to form a single unit adapted to be interposed between two adjacent surfaces of an outer tubular section and the corresponding surfaces of the enclosed inner tubular section in a telescoping mechanism as shown in the preceding FIGS.

The cage 16 constituted by the parts or legs 12 and 13 is illustrated by way of example in FIG. 4 which shows that the cage part 12 comprises a plurality of parallel arranged rollers 18 which are held for free rotation in a frame 19, while the cage part 13 comprises a plurality of parallel arranged rollers 20 which are held for free rotation in a frame 21 which is rigidly secured to the frame 19 by means of a connecting angle piece 22. The cage constituted by the cage parts 14 and 15 is entirely similar and hence will not be described further.

In principle the rollers of the (first) cage 17 run on two adjacent inner surfaces of the section 1. In the embodiment shown this is effected indirectly owing to the provision of races 23 and 24 which are integral each with a corresponding one of two inner surfaces of the section 1 (see FIG. 3). The rollers of the second cage 16, however, run on separate detached races 25 and 26 which are connected to the outer section 1 by resilient means, in this case cup springs 27 and 28, by which they are urged to the inner section 2. As a result the inner section 2 receives a resulting pressure in a direction according to the diagonal of the section 1, which pressure contributes to maintaining the section 2 in a backlash-free connection to the section 1. At the upper ends of the races 23, 24, 25 and 26, studs 29, 30, 31 respectively are mounted which bear on brackets 33, 34, 35 and 36 respectively, (FIGS. 1 and 2) and serve as abutment stops for the movement of the cage parts 12, 13, 14 and 15 respectively (these movements are limited the other direction by the stopper 5).

Between the four inner surfaces of the intermediate section 2 and the outer surfaces of the inner section 3, four further cage parts 37, 38, 39 and 40 entirely similar to cage parts 12, 13, 14 and 15 are correspondingly mounted so as to be axially displaceable and are also rigidly secured to one another in pairs so as to form two cages 41 and 42 which operate in the same manner as the cages 16 and 17. The cage parts 39 and 40 races 43 and 44 are provided which are integral with the section 2, while for the cage parts 37 and 38, races 45 and 46 are provided which are urged toward the section 3 by cup springs 47 and 48 respectively which are supported by the section 2. Consequently the inner section 3 is urged in the same direction as the section 2, i.e., towards the same part of the (fixed) outer section 1, so that the three sections 1, 2 and 3 form a compact structure which exhibits substantially no undersirable transverse displacement i.e., a non-backlash fit.

The races 43 to 46 are provided with end studs 49 to 52 which serve as abutment stops for the movements of the cage parts 37 to 40. These studs 49 to 52 are secured to the races 43 to 46 by means of brackets 53 to 56 respectively (FIGS. 1 and 2).

What is claimed is:

1. A telescoping support mechanism comprising an outer tublar member of substantially square cross-section, an inner tubular member of similar and smaller square cross-section adapted to slide telescopically within said first member with an annular space difined between said members with facing, spaced-apart inner and outer surfaces respectively of said outer and inner members on each of the four sides of said square, namely side A, opposite side AA, side B between sides A and AA, and side BB opposite side B, bearing means between said facing surfaces on each of said four sides, a race intermediate said bearing means and outer surface on sides A and B, spring means intermediate each of said races and said adjacent inner surface urging said race, adjacent bearing means, and outer surface on sides A and B into a non-backlash fit, and further urging said facing surfaces and intermediate bearing means of side AA into a non-backlash fit, side B having non-backlash means similar to side A with corresponding non-backlash fit on sides B and BB.

2. Apparatus according to claim 1 wherein said bearing means comprise roller bearing elements having axis normal to the axial direction of said tubular elements.

3. Apparatus according to claim 1 further comprising a third tubular member similar to and inside said inner tubular member, and bearing means, race, and spring means on two sides thereof adjacent and corresponding to sides A and B of said outer and inner tubular members.

4. Apparatus according to claim 1 wherein said bearing means on said adjacent sides A and B have mutually adjacent edges along their length and are joined along said edges forming in cross-section an L-shape.

5. Apparatus according to claim 4 wherein said bearing means on said adjacent sides AA and BB are joined similarly to said bearing means on sides A and B.

6. Apparatus according to claim 5 wherein said bearing means comprise an L-shaped frame formed by two leg parts extending lengthwise in said annular space, and a plurality of spaced-apart roller bearings mounted on each leg of the frame.

7. A telescoping support mechanism comprising an outer tubular member of substantially square cross-section, an inner tubular member of similar and smaller square cross-section adapted to slide telescopically within said first member with an annular space defined between said members with facing, spaced-apart inner and outer surfaces respectively of said outer and inner members on each of the four sides of said square, namely side A, opposite side AA, side B between sides A and AA, and side BB opposite side B, bearing means between said facing surfaces on each of said four sides, said bearing means on said adjacent sides A and B having mutually adjacent edges along their length and being joined along said edges forming in cross-section an L-shaped, and said bearing means on said adjacent sides AA and BB being joined similarly as said bearing means on sides A and B, a race intermediate said bearing means and outer surface on sides A and B, spring means intermediate each of said races and said adjacent inner surface urging said race, adjacent bearing means, and outer surface on sides A and B into a non-backlash fit, and further urging said facing surfaces and intermediate bearing means of side AA into a non-backlash fit, side B having non-backlash means similar to side A with corresponding non-backlash fit on sides B and BB.

* * * * *